(12) United States Patent
Tidemand-Lichtenberg et al.

(10) Patent No.: US 7,961,772 B2
(45) Date of Patent: Jun. 14, 2011

(54) OPTIMIZED PULSE PUMPED LASER SYSTEM USING FEEDBACK

(75) Inventors: Peter Tidemand-Lichtenberg, Hørsholm (DK); Morten Thorhauge, Bagsværd (DK); Jesper Liltorp Mortensen, Søborg (DK)

(73) Assignee: Advalight, Kongens Lyngby (DK)

( * ) Notice: Subject to any disclaimer, the term of this patent is extended or adjusted under 35 U.S.C. 154(b) by 86 days.

(21) Appl. No.: 12/309,240

(22) PCT Filed: Jul. 10, 2007

(86) PCT No.: PCT/DK2007/000350
§ 371 (c)(1),
(2), (4) Date: Jan. 9, 2009

(87) PCT Pub. No.: WO2008/006371
PCT Pub. Date: Jan. 17, 2008

(65) Prior Publication Data
US 2010/0002732 A1    Jan. 7, 2010

Related U.S. Application Data

(60) Provisional application No. 60/830,718, filed on Jul. 12, 2006.

(30) Foreign Application Priority Data

Jul. 12, 2006   (EP) .................................. 06388051

(51) Int. Cl.
*H01S 5/0683* (2006.01)
*H01S 3/083* (2006.01)
*H01S 3/10* (2006.01)
*H01S 3/23* (2006.01)

(52) U.S. Cl. ........... 372/97; 372/94; 372/10; 372/29.02; 372/29.011

(58) Field of Classification Search ................ 372/97, 372/94, 10, 29.02, 29.011
See application file for complete search history.

(56) References Cited

U.S. PATENT DOCUMENTS
5,121,402 A    6/1992   Scheps
(Continued)

FOREIGN PATENT DOCUMENTS
DE    196 28 233 C1    12/1997

OTHER PUBLICATIONS

Jiri Janousek et al., "Passively Synchronized Dual-Wavelength Q-switched Lasers", 2005 Quantum Electronics and Laser Science Conference (QELS), pp. 865-867.
(Continued)

*Primary Examiner* — Minsun Harvey
*Assistant Examiner* — Marcia A. Golub-Miller
(74) *Attorney, Agent, or Firm* — The Nath Law Group; Jerald L. Meyer; Jiaxiao Zhang

(57) ABSTRACT

A laser system according to the invention comprises pump generating means (x02, x03) for generating at least a first and a second, preferably focused, pump beam, and lasing means (x06, x07) for emitting radiation by being appropriately pumped. The lasing means (x06, x07) is disposed in a first resonator so as to receive the first pump beam in order to generate a first beam (x21) having a first frequency, and the lasing means (x06, x07) is disposed in a second resonator so as to receive the second pump beam in order to generate a second beam (x22) having a second frequency. At least one Q-switch (x08; x17, x18) is disposed in the first and the second resonator, so that the first beam and the second beam both pass a Q-switch (x08; x17, x18). The laser system (x01) has an output (x13) generated from said first beam (x21) and said second beam (x22), and at least a part of said output (x13) is fed back to a regulation system (x14), said regulation system (x14) controlling said pump generating means (x02, x03).

20 Claims, 9 Drawing Sheets

U.S. PATENT DOCUMENTS

| | | |
|---|---|---|
| 5,210,764 A | 5/1993 | Bücher et al. |
| 2003/0012233 A1 | 1/2003 | Kobayashi et al. |
| 2004/0165630 A1 | 8/2004 | Momiuchi et al. |
| 2004/0190574 A1 | 9/2004 | Momiuchi et al. |
| 2006/0126675 A1 | 6/2006 | Eno et al. |

OTHER PUBLICATIONS

Chen Y.F. et al., "Diode-pumped Q-switched laser with intracavity sum frequency mixing in periodically poled KTP" Appl. Phys. B 79, pp. 207-210 (2004).

OPTIMIZED PULSE PUMPED LASER SYSTEM USING FEEDBACK

TECHNICAL FIELD

The following invention relates to a laser system comprising pump generating means for generating at least a first and a second, preferably focused, pump beam, lasing means for emitting radiation by being appropriately pumped, said lasing means being disposed in a first resonator so as to receive the first pump beam in order to generate a first beam having a first frequency, and said lasing means being disposed in a second resonator so as to receive the second pump beam in order to generate a second beam having a second frequency, and at least one Q-switch being disposed in the first and the second resonator, so that the first beam and the second beam both pass a Q-switch, and said laser system having an output generated from said first beam and said second beam.

Laser systems, which comprise two or more lasers or gain elements or alternatively a gain element generating two or more laser lines (i.e. two or more wavelengths), and in which a so-called sum frequency generation or another form of nonlinear conversion is involved, are a relatively new area of research. In order to achieve a more efficient conversion, the lasers can be pulsed. The individual lasers can be pulsed by pulsing a pump source (not that efficient) or they can be pulsed by periodically changing the so-called Q-factor of the cavity of the laser by modulating the losses in the cavity. This can be achieved by using a so-called Q-switch. The Q-switch can either be active, such as an electro-optical or acousto-optical Q-switch, or passive using a saturable absorber.

One of the main problems of such systems is to synchronise the individual lasers since they usually have different pulse build-up times. Thereby, the pulses that propagate in the cavity will not temporally overlap. This is a problem, since the nonlinear conversion only can occur if the pulses overlap. If the overlap between the individual pulses is not in any way controlled or regulated, the overlap between the pulses will be random and therefore not optimised. Consequently, the nonlinear conversion will not be optimised either.

One method for optimising the overlap is to regulate the focus of the emitted light from the pump source in the laser element. This is of course only possible in systems, where the light from the pump source is focused into the laser element. Thus, if the pump source is a gas discharge lamp or a blitz lamp, it is not possible to use this type of regulation. In any case, it is difficult to change the focus of the pump source beam in commercial laser systems, since the functionality of the laser is highly dependent on an accurate focus. Furthermore, mechanical systems for changing the focal point have inherent inaccuracies and will additionally considerably increase the overall cost of the laser system.

Another method for regulating the pulse overlap relates to changing or translating one or more mirrors of the cavity in order to change the eigen-focus in the laser element. This changes the overlap between the cavity mode (i.e. the spot size in the laser element) and the pump source, whereby the gain of the laser element is changed. In addition, the change in cavity mode itself can change the gain. Once again, this method is mechanically based and therefore involves a considerable increase to the overall cost of the system as well as introducing a source for misalignment.

A third possibility is to change the position of the laser element with respect to the focal point of the pump source. However, this is only possible if the laser element is shorter than the cavity arm, in which the laser element is disposed. Additionally, it must be possible to translate the laser element, which again means that mechanical translation means are necessary. Thus, this method has the same disadvantages as the aforementioned methods.

A fourth possibility is to employ a method, where the cavities have static or variable, individual losses so that the difference in intracavity losses outbalance the difference between the respective gains of the laser elements.

A fifth possibility is to utilise a plurality of Q-switches and a variable electronic delay between them. This is a somewhat more complex solution, which demand for separate electrical supplies for the individual Q-switches as well as an electronic variable delay line. If the system operates in the nanosecond range, which is often the case for such systems, such electronics are relatively expensive and sensitive. Also, if every laser line of the system uses a separate Q-switch, this increases the overall cost of the system, since Q-switches generally are relatively expensive.

U.S. Pat. No. 5,121,402 discloses a multiple gain-element ring laser, which has the capability of being scaled to higher pulsed output powers. The ring laser comprises a plurality of pump sources and corresponding gain elements. The resulting laser beams from the individual gain elements all pass the same Q-switch in the ring cavity.

DISCLOSURE OF INVENTION

The purpose of the present invention is to provide a new and improved laser system, in which the pulse overlap between two or more laser lines of the system is optimisable.

This is according to the invention achieved by at least a part of said output being fed back to a regulation system, which regulates the build-up time of individual laser pulses of the first and second beam by controlling the intensity output of said pump generating means.

The regulation system is thereby adapted to control the intensity output of the pumping means, which in turn regulates the gain of the laser means, thereby controlling the build-up time of the individual laser pulses of said first and second beam. The overlap between the individual pulses can thereby be optimised in a simple manner.

In a preferred embodiment of the invention, said at least one Q-switch is an active Q-switch, such as an electro-optical or an acousto-optical Q-switch. Active Q-switches are favourable as compared to passive Q-switches, since the latter only have a limited working interval with respect to the repetition frequency and the pulse effect. Therefore, typically an invariable working point has to be chosen.

According to a preferred embodiment of the invention, said at least one Q-switch is disposed in both the first resonator and the second resonator, so that the first beam and the second beam both pass the same Q-switch.

According to a preferred embodiment, the pump means are a single pump source, such as a laser diode. This single pump source is thus used to generate at least said first and said second pump beam. In this case, it is possible to regulate the individual pump beam effect by use of methods known per se, such as by use of a phase retarder, a polarising beam splitter or a birefringent crystal.

Alternatively, the pump means comprise at least a first pump source, such as a first laser diode, for generating the first pump beam, and a second pump source, such as a second laser diode, for generating the second pump beam. Thereby, a particular simple embodiment of the pump means is achieved.

According to a preferred embodiment according to the invention, the lasing means is a single gain element or laser element. This single laser element is thus used to generate at least two pulsed laser beams having different frequencies or wavelengths.

Alternatively, the lasing means comprise at least a first gain element or lasing element for generating said first beam, and a second gain element or laser element for generating said second beam. Thereby, a particular simple embodiment of the lasing means is achieved, in which separate laser elements are used for generating the individual laser lines (or wavelengths) of the system.

The laser system can of course comprise three, four or even more pump sources as well as three, four or more gain elements, the resulting laser system thus generating beams with three, four or more frequencies. The gain element(s) can for instance be a Nd:YAG or a Nd:YVO4 crystal.

According to a preferred embodiment of the invention, the first beam follows a first path in said first resonator, and the second beam follows a second path in said second resonator, and wherein at least a part of the first path and the second path are coinciding. In other words, said first resonator and said second resonator have a coinciding intracavity optical propagation axis. The first laser element and the second laser element can thus be positioned in the parts of the first cavity and second cavity, respectively, which are not coinciding.

In an embodiment according to the invention, said first resonator and/or said second resonator are linear resonator cavities. In another embodiment according to the invention, said first resonator and/or said second resonator are ring resonator cavities. Common for all these embodiments is that the cavities usually comprise a plurality of mirrors, one or more of these mirrors typically being common for all the resonator cavities. The cavity mirrors are preferably reflection coated to yield a high reflection coefficient for at least said first and said second frequency.

According to a preferred embodiment, the first resonator and the second resonator have a common output mirror. Said output mirror is typically antireflection coated to output the desired wavelength or wavelengths.

According to a particularly preferred embodiment of the invention, the laser system additionally comprises a nonlinear conversion element. The nonlinear conversion element can thus be used for inter alia sum frequency mixing or frequency difference mixing using both the fundamental modes and the harmonics of the first and second beam, respectively. The conversion element can for instance be a periodically poled KTP crystal or another nonlinear optical element.

According to an embodiment of the invention, the nonlinear conversion element is positioned in the coinciding intracavity optical propagation axis. The conversion of the first and second beam can thus be achieved before being output through the common output mirror.

According to an alternative embodiment, the nonlinear conversion element is positioned after the common output mirror. In this case both the first beam and the second beam are output from the common output mirror and thus converted outside of their respective cavities. However, the nonlinear conversion element can also be positioned in the first cavity but outside the second cavity.

In a particularly preferred embodiment of the invention, at least a part of the output from the nonlinear conversion element is fed back to the regulation system. This yields a particular simple way to regulate the pump sources using the regulation system, since the output from the conversion element directly indicates the efficiency of the conversion and thereby also the degree of overlap between the pulses.

The laser system can comprise two or more Q-switches, which for instance are positioned in the parts of the cavities, which are not coinciding. This embodiment is particularly useful in systems, in which three or more laser beams are generated, or in systems where the individual laser lines have a large wavelength difference.

According to a preferred embodiment of the invention, the time difference between activation of said Q-switches is fixed. Alternatively, the time difference between activation of said Q-switches is variable.

In a preferred embodiment according to the invention, the output from the laser system is a nonlinear converted beam. The frequency of the converted beam is thus for instance the sum or the difference of the frequencies of the individual beams of the resonator cavities or their harmonics. It is for instance possible to use individual resonator laser beams lasing at 1064 nm and 1342 nm, respectively, in order to generate a yellow-orange laser beam at 593 nm.

According to another preferred embodiment of the invention, the output from the system has multiple laser lines or frequencies. These individual laser lines can for instance be the individual resonator laser beams, i.e. said first and said second beam. It is also possible to achieve a multi laserline output using the nonlinear conversion element. In the case using individual resonator laser beams lasing at 1064 nm and 1342 nm and further using the harmonics of these beams, it is possible to achieve individual output lines of 532 nm, 671 nm and 593 nm, i.e. green, red and yellow output.

The system is usable for a wide range of applications. The laser system can for instance be used in particle image velocimetry (PIV) systems, which often utilise laser beams of different wavelengths. Similarly, the laser system can also be used for laser Doppler anemometry systems using two or more wavelengths.

The laser system can also be used for inter alia RGB-displays, since the system can generate the individual laser lines needed for such displays.

The laser system can also be used for generating solid state lasers with a yellow output. Yellow laser systems are today only found commercially on a very limited scale. One of the most promising areas of use for the system is in opto-medical applications, such as dermatology, photodynamic therapy and ophthalmology. Blood has a high absorption coefficient for yellow light, and this can for instance be utilised for treatment of vascular related damages, such as port-wine stains, in acne treatment and skin rejuvenation. Furthermore, the laser system can be used for photodynamic therapy, which is a promising method for treating skin cancer. The opto-medical applications mentioned are today often based on dye lasers. The laser system according to the invention can for instance generate yellow light with a pulse length in the nanosecond range with a repetition frequency in the kilohertz range and with an average effect of several watts.

The laser system is also applicable for laser isotope separation.

BRIEF DESCRIPTION OF THE DRAWINGS

The invention is explained in greater detail below with reference to the accompanying drawings, in which.

BEST MODES FOR CARRYING OUT THE INVENTION

Figure 1:
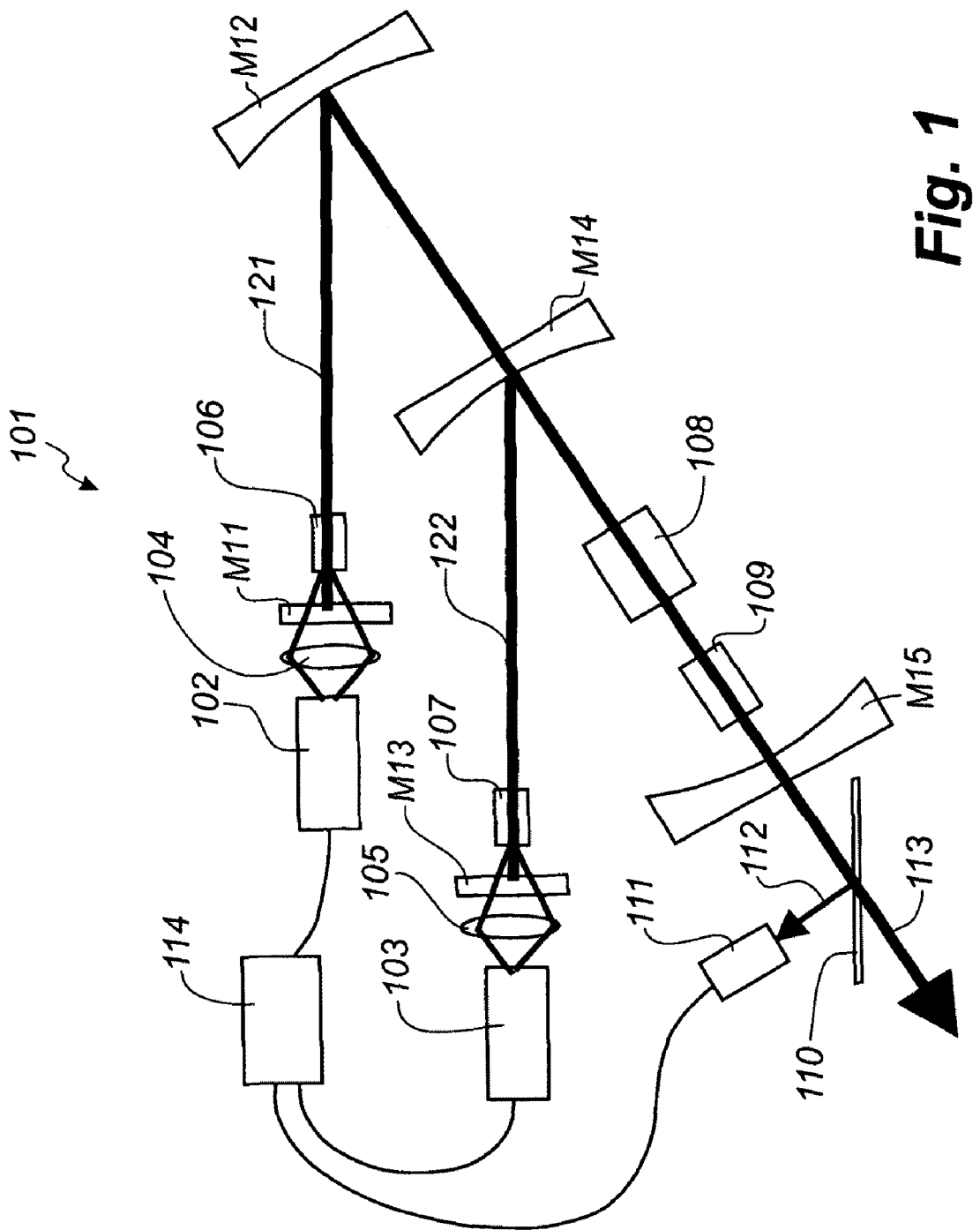
FIG. 1 shows a first embodiment of a laser system according to the invention, FIG. 2 a second embodiment of a laser system according to the invention, FIG. 3 a third embodiment of a laser system according to the invention, FIG. 4 a fourth embodiment of a laser system according to the invention, FIG. 5 a fifth embodiment of a laser system according to the invention, FIG. 6 a schematic diagram of a feedback regulation system according to the invention, FIG. 7 the conversion efficiency as a function of the pump power of the first and the second pump sources, FIG. 8 the conversion efficiency as a function of the pump power of the second pump source for a given fixed pump power for the first pump source, and FIG. 9 a series of measurement demonstrating the dependency between the pump intensity and the pulse overlap.

FIG. 1 shows a first embodiment of the laser system according to the invention. The laser system 101 comprises a first pump source 102 and a second pump source 103, preferably in form of a first laser diode and a second laser diode. The light emitted from the first pump source 102 is focused by a first condensing lens 104 and into a first gain element or laser element 106. When this laser element 106 is pumped, a laser pulse starts building up and is emitted from the laser element 106. A resulting emitted first laser beam 121 having a first frequency is emitted in both directions in a first linear resonator cavity, which comprises three mirrors M11, M12 and M15. The three mirrors M11, M12 and M15 are preferably reflection coated in order to have high reflectance at the first frequency.

Similarly, the light emitted from the second pump source 103 is focused by a second condensing lens 105 and into a second gain element or laser element 107. When the second laser element 107 is pumped, a laser pulse starts building up and is emitted from the laser element 107. A resulting emitted laser beam 122 is emitted in both directions in a second linear resonator cavity, which comprises three mirrors M13, M14 and M15.

The first resonator and the second resonator path have a coinciding beam path part between mirror M14 and M15. A Q-switch 108 and a nonlinear conversion element 109 are positioned in this coinciding intracavity propagation path. The Q-switch 108 is preferably an active Q-switch, such as an electro-optical Q-switch or an acousto-optical Q-switch. The nonlinear conversion element 109 converts the first beam 121 and the second beam 122 by generating a converted beam having a frequency, which is the sum or the difference between the first frequency and the second frequency or the harmonics of the first and second frequencies. The output from the nonlinear conversion element 109 can also contain several laser lines, i.e. several beams of different wavelengths/frequencies.

The converted light beam, and if desired also the first 121 and the second beam 122, is output through the common output mirror M15, which preferably is anti-reflection coated to output the desired wavelength of the converted beam. A feedback part 112 of the output 113 is fed back via a beam splitter 110 to for instance a photo diode or a power meter 111. The detected signal is processed by a regulation system or microprocessor 114, which controls the first pump source 102 and/or the second pump source 103. The pump sources 102, 103 in turn regulate the pulse build-up times for the laser elements 106 and 107, since the pulse build-up time is dependent on the intensity of the pump beam. Since the converted signal is a direct measure for the efficiency of the pulse overlap between the pulses of the first beam 121 and the second beam 122, the signal detected by the photo diode 111 can be used for regulating the intensity output of the first pump source 102 and/or the second pump source 103, and thereby the corresponding build-up times of the individual laser pulses. It is thereby possible to optimise the pulse overlap between the pulses of the first beam 121 and the second beam 122 by varying the pump intensity and finding the maximum output of the feedback signal 112.

The nonlinear conversion element 109 can also be positioned after the common output mirror M15. If the laser system for instance is a multiline laser system emitting laser beams of the first frequency and the second frequency only, the nonlinear conversion element 109 can be positioned in the path of the feedback beam 112, thereby only using the nonlinear conversion element 109 for the feedback regulation.

The first embodiment can also be modified so that it comprises two Q-switches, where a first Q-switch is positioned in the first resonator in the path between mirror M11 and M14, and a second Q-switch is positioned in the second resonator in the path between mirror M13 and M14. In this case, the Q-switches can be temporally synchronised, for instance if the difference in wavelengths between the first and second beam is relatively large.

Figure 2:
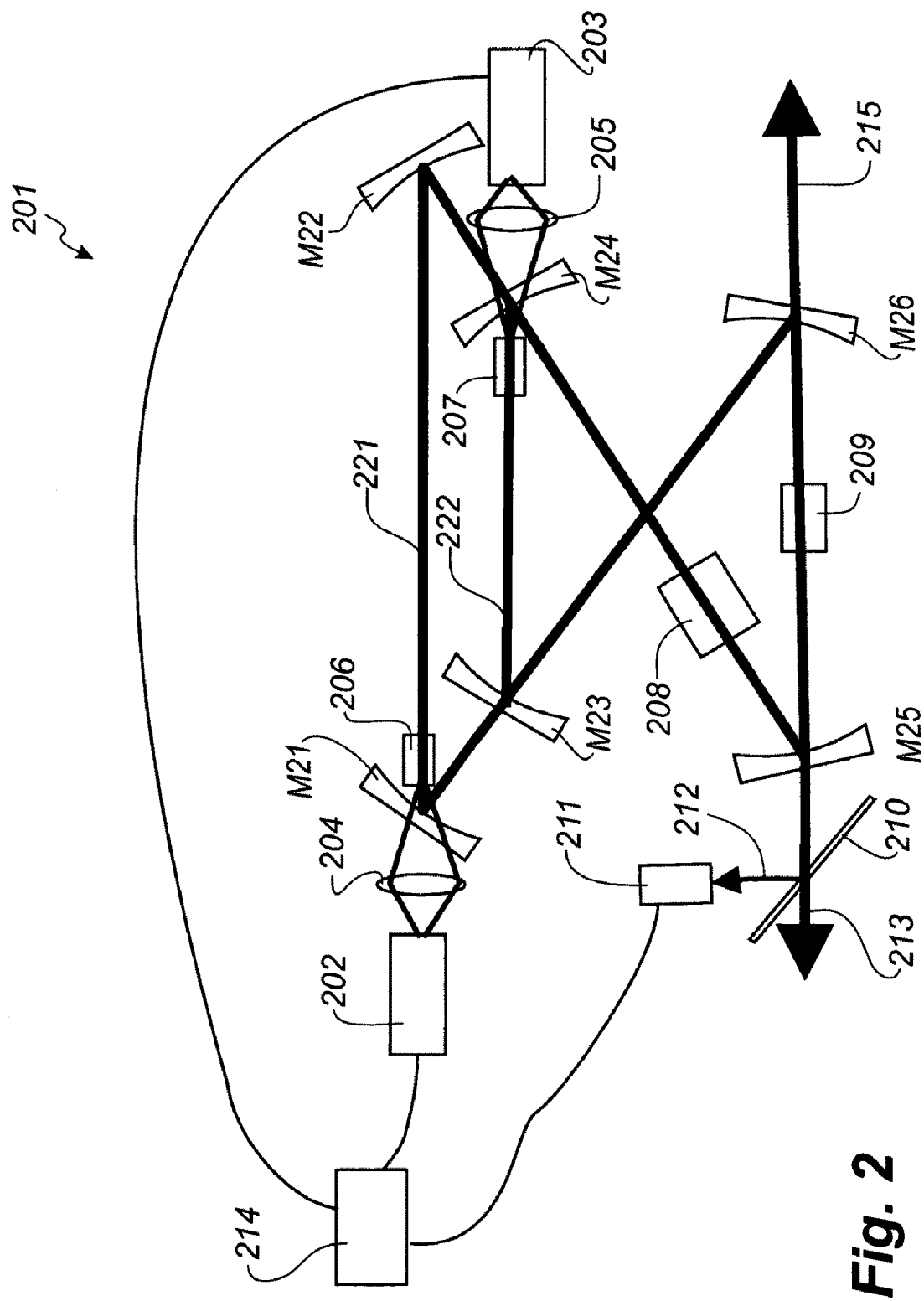

FIG. 2 shows a second embodiment of the laser system according to the invention, in which like reference numerals refer to like parts of the first embodiment. The laser system 201 comprises a first pump source 202 and a second pump source 203, preferably in form of a first laser diode and a second laser diode. The light emitted from the first pump source 202 is focused by a first condensing lens 204 and into a first gain element or laser element 206. When this laser element 206 is pumped, a laser pulse starts building up and is emitted from the laser element 206. A resulting emitted first laser beam 221 having a first frequency is emitted in both directions in a first ring resonator cavity, which comprises four mirrors M21, M22, M25 and M26. The four mirrors M21, M22, M25 and M26 are preferably reflection coated in order to have high reflectance at the first frequency.

Similarly, the light emitted from the second pump source 203 is focused by a second condensing lens 205 and into a second gain element or laser element 207. When the second laser element 207 is pumped, a laser pulse starts building up and is emitted from the laser element 207. A resulting emitted laser beam 222 is emitted in both directions in a second ring resonator cavity, which comprises four mirrors M23, M24, M25 and M26.

The first resonator and the second resonator path have a coinciding beam path part from mirror M24 to M25 and then from M25 to M26 and on to M23. A Q-switch 208 and a nonlinear conversion element 209 are positioned in this coinciding intracavity propagation path. The Q-switch 208 is preferably an active Q-switch, such as an electro-optical Q-switch or an acousto-optical Q-switch. The nonlinear conversion element 209 converts the first beam 221 and the second beam 222 by generating a converted beam having a frequency, which is the sum or the difference between the first frequency and the second frequency or the harmonics of the first and second frequencies. The output from the nonlinear conversion element 209 can also contain several laser lines, i.e. several beams of different wavelengths/frequencies.

The converted light beam, and if desired also the first 221 and the second beam 222, is output through the common output mirrors M25 and M26, which are preferably anti-reflection coated to output the desired wavelength/frequencies. A feedback part 212 of a first output 213 is fed back via a beam splitter 210 to for instance a photo diode or a power meter 211. The detected signal is processed by a regulation system or microprocessor 214, which controls the first pump source 202 and/or the second pump source 203. The pump sources 202, 203 in turn regulate the pulse build-up times for the laser elements 206 and 207, since the pulse build-up time is dependent on the intensity of the pump light. Since the converted signal is a direct measure for the efficiency of the pulse overlap between the pulses of the first beam 221 and the second beam 222, the signal detected by the photo diode 211 can be used for regulating the intensity output of the first pump source 202 and/or the second pump source 203, and thereby the corresponding build-up times of the individual laser pulses. It is thereby possible to optimise the pulse overlap between the pulses of the first beam 221 and the second beam 222 by varying the pump intensity and finding the maximum output of the feedback signal 212.

The nonlinear conversion element 209 can also be positioned behind the common output mirror M25. If the laser system for instance is a multiline laser system emitting laser beams of the first frequency and the second frequency only, the nonlinear conversion element 209 can be positioned in the path of the feedback beam 212, thereby only using the nonlinear conversion element 209 for the feedback regulation.

The embodiment can also be modified so that it comprises two Q-switches, where a first Q-switch is positioned in the first resonator in the path between mirror M21 and M22, and a second Q-switch is positioned in the second resonator in the path between mirror M23 and M24. In this case, the Q-switches can be temporally synchronised, for instance if the difference in wavelengths between the first and second beams is relatively high.

In the shown embodiment, the first pump source 202 is positioned behind mirror M21 and the second pump source behind mirror 24. However, the first pump source 202 may be positioned behind mirror M22 instead and/or the second pump source 203 can be positioned behind mirror M23. Also, the ring resonator cavities can comprise an optical diode so that the first beam 221 and second beam 222 only propagate in one direction in the ring resonator cavities. Alternatively, the laser system 201 can comprise a second output 215 through for instance mirror M26.

Figure 3:
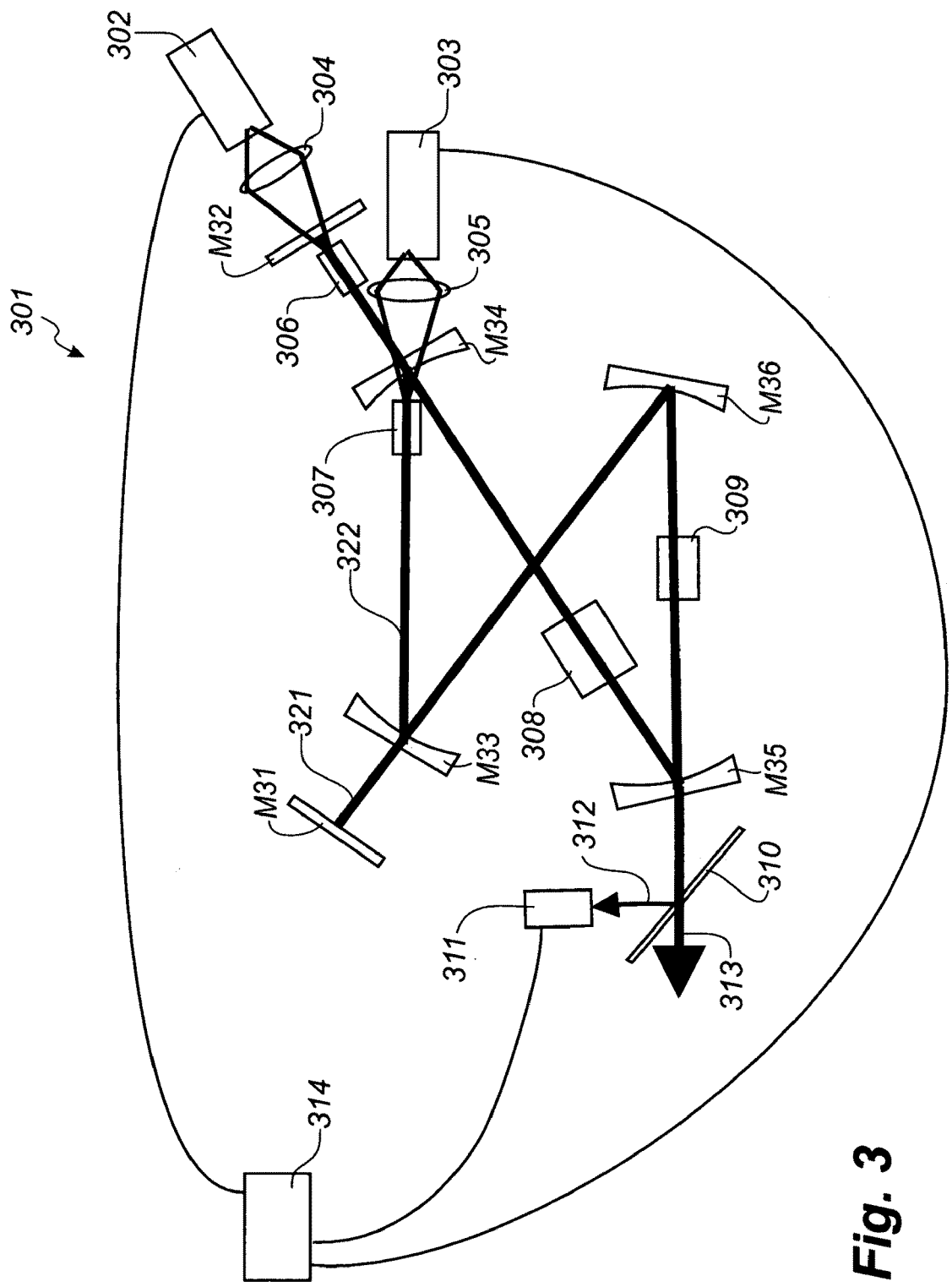

FIG. 3 shows a third embodiment of the laser system according to the invention, in which like reference numerals refer to like parts of the first and second embodiments. The laser system 301 comprises a first pump source 302 and a second pump source 303, preferably in form of a first laser diode and a second laser diode. The light emitted from the first pump source 302 is focused by a first condensing lens 304 and into a first gain element or laser element 306. When this laser element 306 is pumped, a laser pulse starts building up and is emitted from the laser element 306. A resulting emitted first laser beam 321 having a first frequency is emitted in both directions in a first linear resonator cavity, which comprises four mirrors M31, M32, M35 and M36. The four mirrors M31, M32, M35 and M36 are preferably reflection coated in order to have high reflectance at the first frequency.

Similarly, the light emitted from the second pump source 303 is focused by a second condensing lens 305 and into a second gain element or laser element 307. When the second laser element 307 is pumped, a laser pulse starts building up and is emitted from the laser element 307. A resulting emitted laser beam 322 is emitted in both directions in a second ring resonator cavity, which comprises four mirrors M33, M34, M35 and M36.

The first resonator and the second resonator path have a coinciding beam path part from mirror M34 to M35 and then from M35 to M36 and on to M33. A Q-switch 308 and a nonlinear conversion element 309 are positioned in this coinciding intracavity propagation path. The Q-switch 308 is preferably an active Q-switch, such as an electro-optical Q-switch or an acousto-optical Q-switch. The nonlinear conversion element 309 converts the first beam 321 and the second beam 322 by generating a converted beam having a frequency, which is the sum or the difference between the first frequency and the second frequency or the harmonics of the first and second frequencies. The output from the nonlinear conversion element 309 can also contain several laser lines, i.e. several beams of different wavelengths/frequencies.

The converted light beam, and if desired also the first 321 and the second beam 322, is output through the common output mirror M35, which preferably is anti-reflection coated to output the desired wavelength/frequencies. A feedback part 312 of the output 313 is fed back via a beam splitter 310 to for instance a photo diode or a power meter 311. The detected signal is processed by a regulation system or microprocessor 314, which controls the first pump source 302 and/or the second pump source 303. The pump sources 302, 303 in turn regulate the pulse build-up times for the laser elements 306 and 307, since the pulse build-up time is dependent on the intensity of the pump light. Since the converted signal is a direct measure for the efficiency of the pulse overlap between the pulses of the first beam 321 and the second beam 322, the signal detected by the photo diode 311 can be used for regulating the intensity output of the first pump source 302 and/or the second pump source 303, and thereby the corresponding build-up times of the individual laser pulses. It is thereby possible to optimise the pulse overlap between the pulses of the first beam 321 and the second beam 322 by varying the pump intensity and finding the maximum output of the feedback signal 312.

The nonlinear conversion element 309 can also be positioned after the common output mirror 325. If the laser system for instance is a multiline laser system emitting laser beams of the first frequency and the second frequency only, the nonlinear conversion element 309 can be positioned in the path of the feedback beam 312, thereby only using the nonlinear conversion element 309 for use in the feedback regulation.

Figure 4:
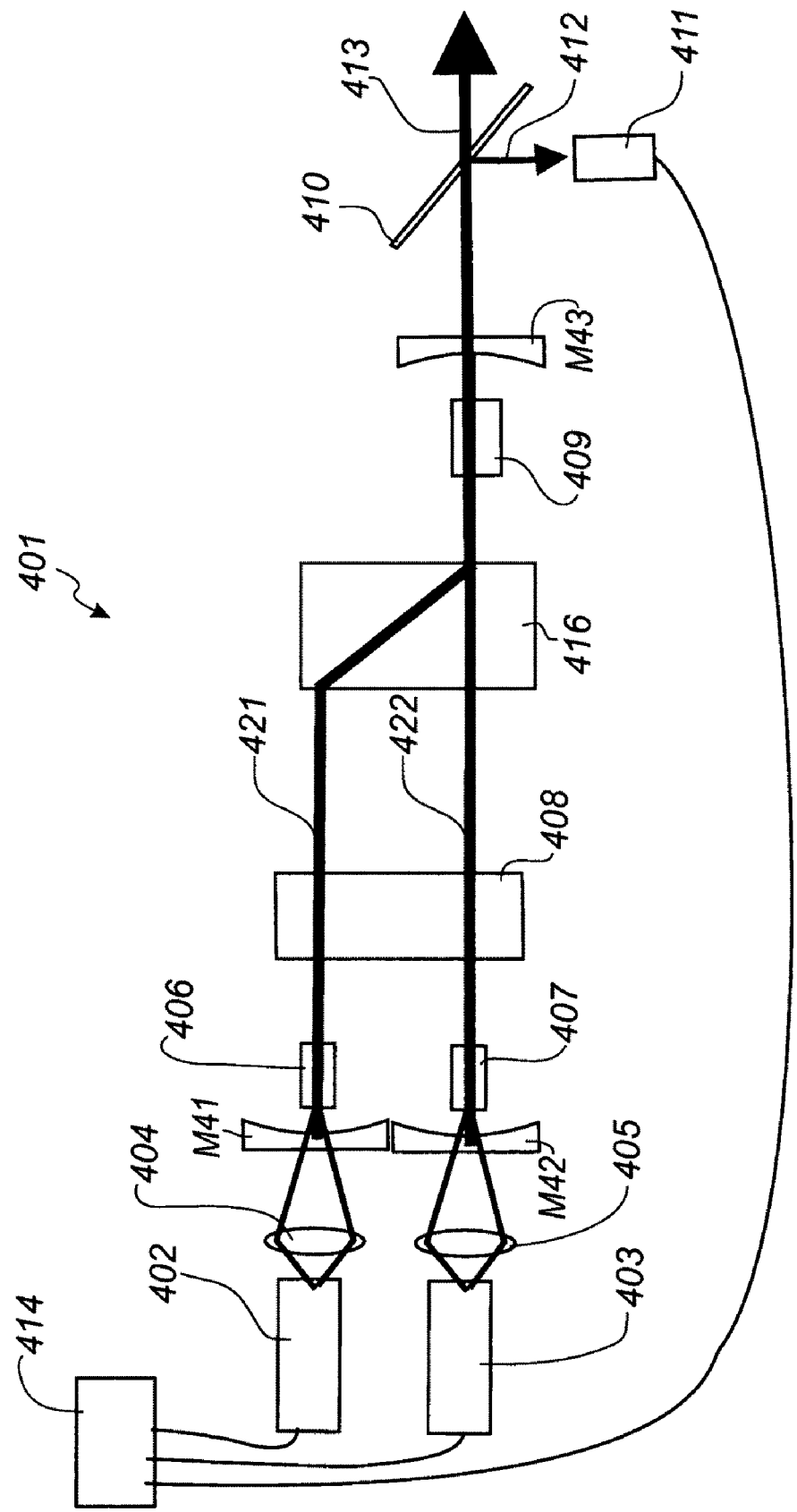

FIG. 4 shows a fourth embodiment of the laser system according to the invention. The laser system 401 comprises a first pump source 402 and a second pump source 403, preferably in form of a first laser diode and a second laser diode. The light emitted from the first pump source 402 is focused by a first condensing lens 404 and into a first gain element or laser element 406. When this laser element 406 is pumped, a laser pulse starts building up and is emitted from the laser element 406. A resulting emitted first laser beam 421 having a first frequency is emitted in both directions in a first linear resonator cavity, which comprises two mirrors M41 and M43, and beam combining means 416. The two mirrors M41 and M43 are preferably reflection coated in order to have high reflectance at the first frequency.

Similarly, the light emitted from the second pump source 403 is focused by a second condensing lens 405 and into a second gain element or laser element 407. When the second laser element 407 is pumped, a laser pulse starts building up and is emitted from the laser element 407. A resulting emitted laser beam 422 is emitted in both directions in a second linear resonator cavity, which comprises two mirrors M42 and M43 and the beam combining means 416. The beam combining means 416 can for instance be a birefringent crystal and ensures that the two beams 421, 422 having different wavelengths follow two different paths.

The first resonator and the second resonator path have a coinciding beam path part between mirror M43 and the beam combining means 416. A nonlinear conversion element 409 is positioned in this coinciding intracavity propagation path. A common Q-switch is disposed next to the two laser elements 406, 407 so that it overlaps both the first beam 421 and the second beam path 422. The Q-switch 408 is preferably an active Q-switch, such as an electro-optical Q-switch or an acousto-optical Q-switch. The nonlinear conversion element 409 converts the first beam 421 and the second beam 422 by generating a converted beam having a frequency, which is the sum or the difference between the first frequency and the second frequency or the harmonics of the first and second frequencies. The output from the nonlinear conversion element can also contain several laser lines, i.e. several beams of different wavelengths/frequencies.

The converted light beam, and if desired also the first and the second beam, is output through the common output mirror M43, which preferably is anti-reflection coated to output the desired wavelength/frequencies. A feedback part 412 of the output 413 is fed back via a beam splitter 410 to for instance a photo diode or a power meter 411. The detected signal is processed by a regulation system or microprocessor 414, which controls the first pump source 402 and/or the second pump source 403. The pump sources 402, 403 in turn regulate the pulse build-up times for the laser elements 406 and 407, since the pulse build-up time is dependent on the intensity of the pump light. Since the converted signal is a direct measure for the efficiency of the pulse overlap between the pulses of the first beam 421 and the second beam 422, the signal detected by the photo diode 411 can be used for regulating the intensity output of the first pump source 402 and/or the second pump source 403, and thereby the corresponding build-up times of the individual laser pulses. Thereby, it is possible to optimise the pulse overlap between the pulses of the first beam 421 and the second beam 422 by varying the pump intensity and finding the maximum output of the feedback signal 412.

The nonlinear conversion element 409 can also be positioned after the common output mirror M43. If the laser system for instance is a multiline laser system emitting laser beams of the first frequency and the second frequency only, the nonlinear conversion element 409 can be positioned in the path of the feedback beam 412, thereby only using the nonlinear conversion element for use in the feedback regulation.

Figure 5:
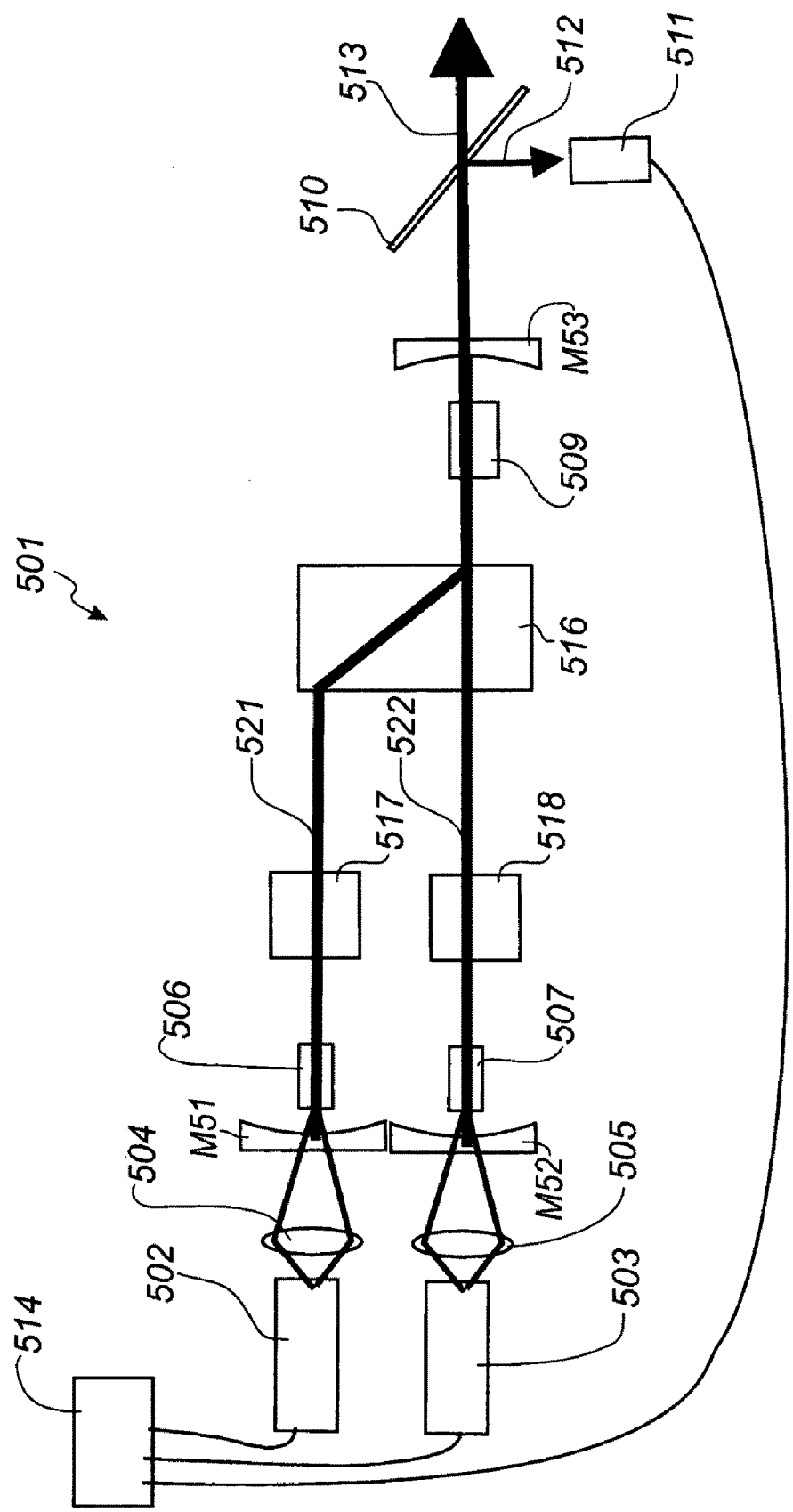

FIG. 5 shows a fifth embodiment of the laser system according to the invention, in which like reference numerals refer to like parts of the fourth embodiment. Therefore, only the difference between the two embodiments is described. The fifth embodiment only differs from the fourth embodiment in that it comprises two separate Q-switches. A first Q-switch 517 is disposed in the first beam path 521 next to the first laser element 506. A second Q-switch 518 is disposed in the first beam path 522 next to the first laser element 507.

Figure 6:
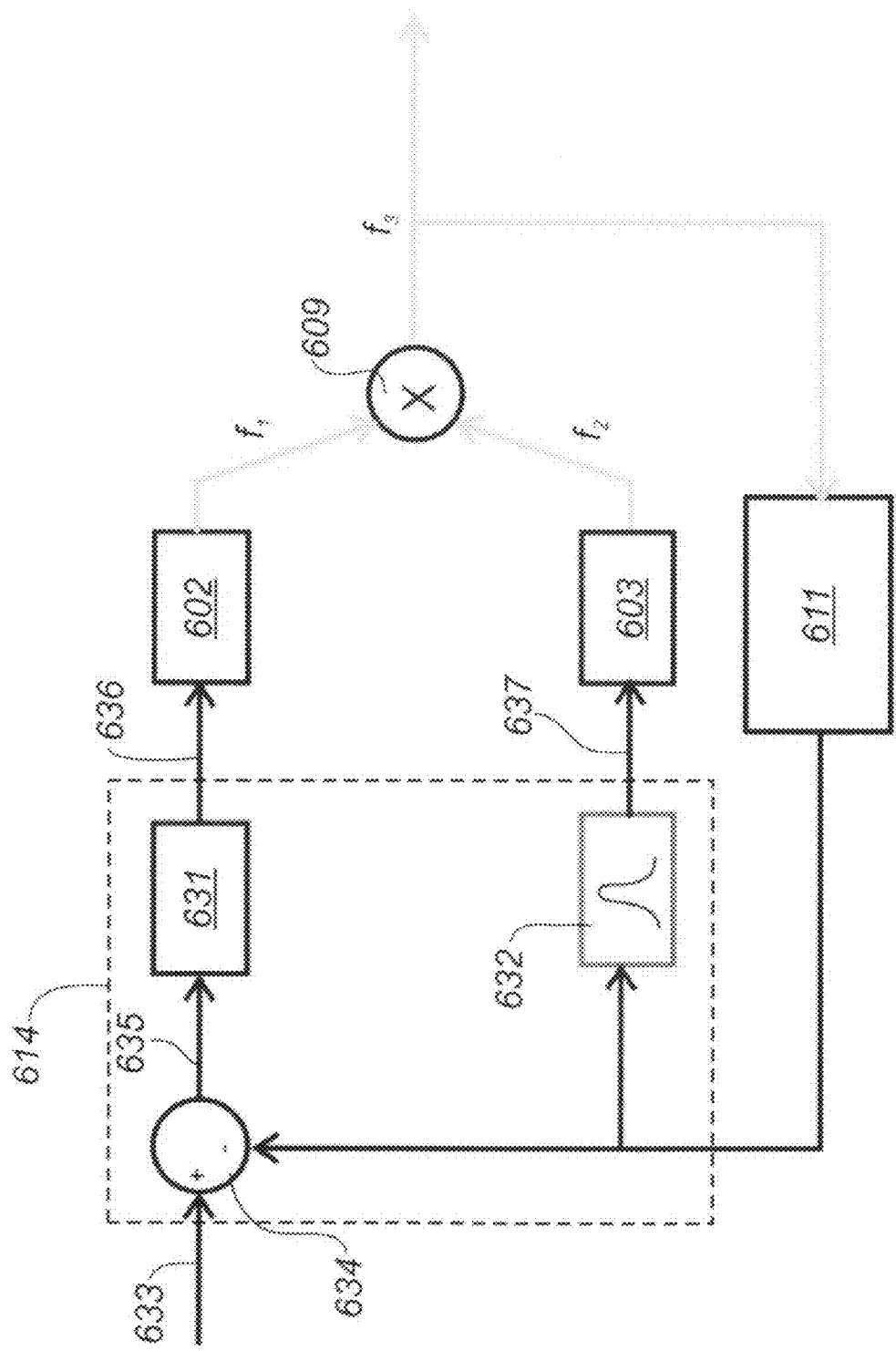

FIG. 6 shows a schematic illustration of the functionality of the feedback regulation system. As described in the five previous embodiments, a first pump source 602 is used for generating a first beam having a first frequency $f_1$, and a second pump source 603 is used for generating a second beam having a second frequency $f_2$. A nonlinear conversion element 609 is used for generating a converted beam having a third frequency $f_3$. At least a part of this beam is detected by a photo diode or a power meter 611.

The feedback regulation system 614 functions by letting the first pump source 602 regulate the output effect of the resulting converted beam, and the second pump source 603 has to perform an optimisation routine in order to maximise the output effect of the converted beam for the chosen effect of the first pump source 602. The regulating of the system functions by comparing 634 the detected signal with a reference signal 633. A resulting error signal 635, which is the difference between the detected signal and the reference signal 633 is fed to a control system 631, which based on the error signal 635 generates a control signal 636, which in turn regulates the output power of the first pump source 602. Based on the chosen set point for the first pump source 602, the feedback system uses the detected signal to perform an optimisation using an optimisation system 632 in order to generate a control signal 637, which in turn regulates the output power of the second pump source 603.

In order for the regulation system 614 not to become unstable due to the optimisation routing, the optimisation routine has to be performed more often than the regulation routine. Hereby, it is also possible to average out the contribution from the optimisation.

Figure 7:
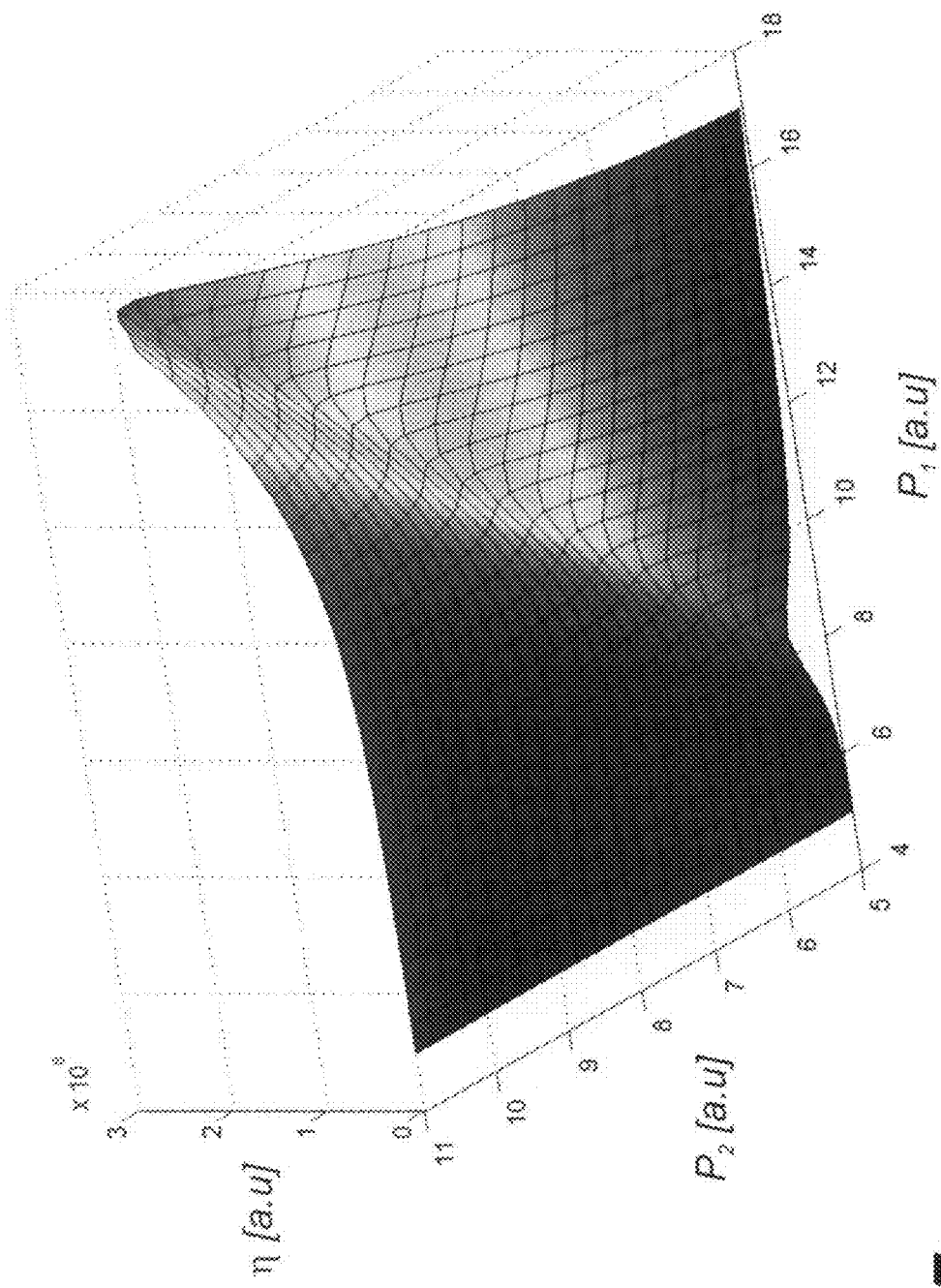

FIG. 7 shows an example on how the conversion efficiency $\eta$ can manifest itself from the pulse overlap from the two laser beams as a function of the pump power $P_1$ of the first pump source 602 and the pump power $P_2$ of the second pump source 603. As indicated in FIG. 7 the regulation of the output power of the converted beam will be a linear function over a large interval for the pump power of the pump sources 602, 603.

Figure 8:
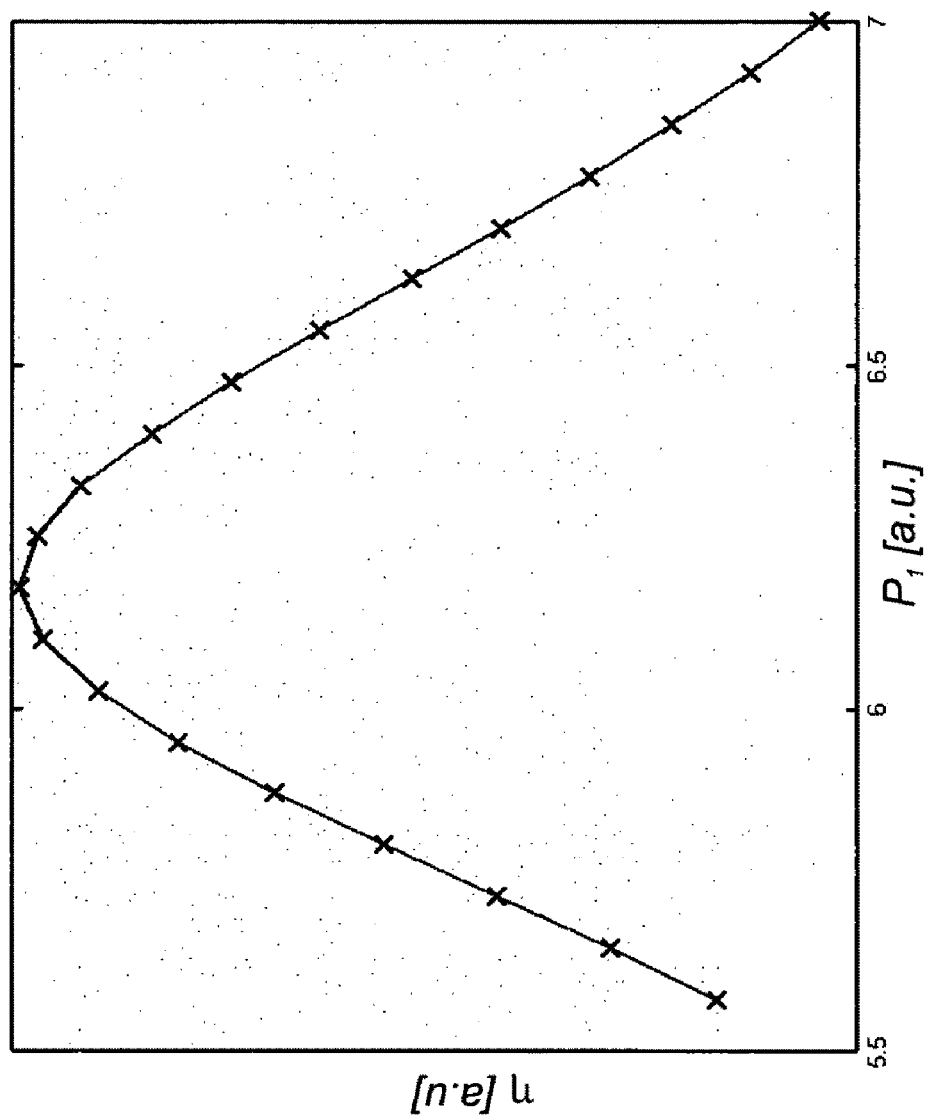

FIG. 8 shows the conversion efficiency $\eta$ as a function of the pump power $P_2$ of the second pump source 603 for a given set point, i.e. a fixed pump power P1 of the first pump source 602 set via the regulation routine. The graph shows that the conversion efficiency has a Gaussian-like or bell-shaped dependence on the pump power $P_2$ of the second pump source. In order to optimise the system, the optimisation routine is run using the optimisation system 632 in order to find the vertex of the graph or in other words to maximise the conversion efficiency $\eta$ by regulating the pump power $P_2$ of the second pump source 603.

Figure 9A:
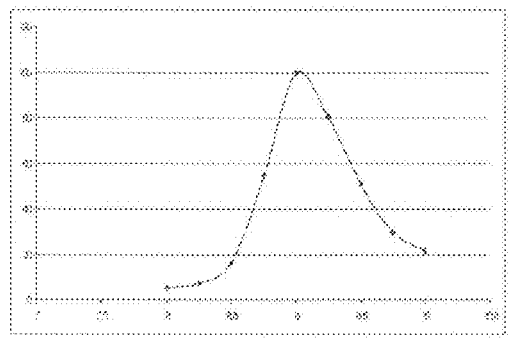
Figure 9B:
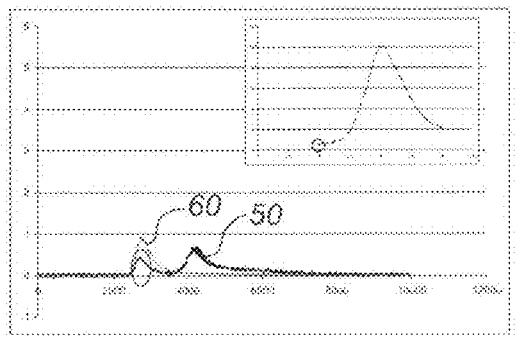
Figure 9C:
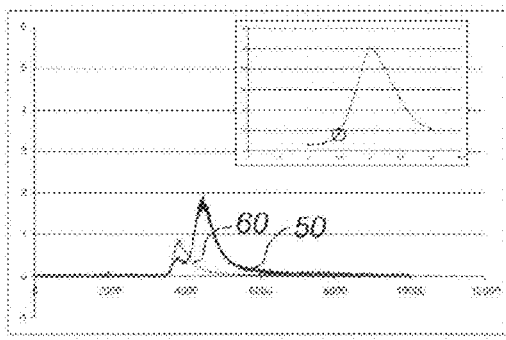
Figure 9D:
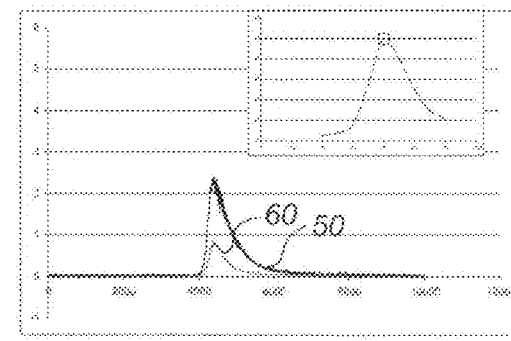
Figure 9E:
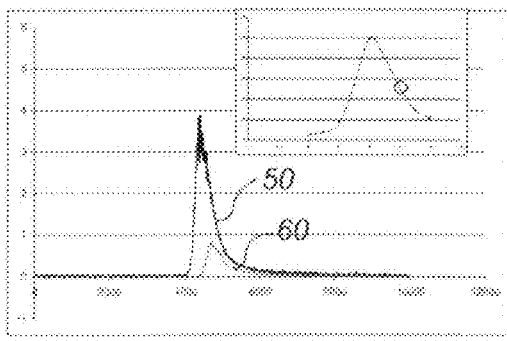
Figure 9F:
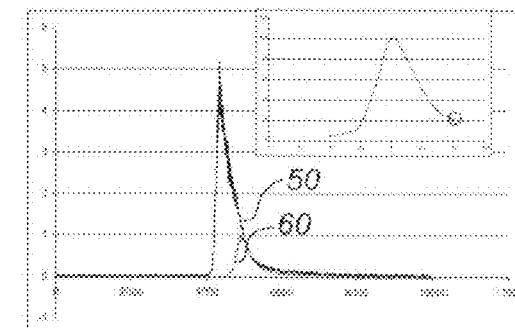

FIGS. 9a-f show a number of measurements, which demonstrate the relationship between the pump intensity and the pulse overlap. During the measurements the first pump source (a first laser diode for a 1319 nm laser) was driven with a constant current, while the current of the second pump source (a second laser diode for a 1064 nm laser) was varied. FIG. 9a shows the sum frequency output power in arbitrary units as a function of the second pump source current. The pump power is linearly proportional to the current. As seen from the measurements and the shown curve fit, the sum frequency output power shows a nearly Gaussian relationship with the pump current (or power). FIG. 9b-f show oscillator traces from the measurements with the frequency depicted on the x-axis (in arbitrary units) and the power output from the 1064 nm laser (marked with reference numeral 50) and the power output from the 1319 nm (marked with reference numeral 60) on the y-axis, respectively. The corresponding sum frequency output power is shown in the top right corner of the individual figures. The measurements clearly show that the sum frequency output power is highly affected by the current of the pump source with a non-linear relationship. FIG. 9c additionally shows spill-over effects from the 1319 nm pulses to the 1064 nm pulses. The spill-over effects are detection artefacts, which can be seen do not affect the sum frequency output power.

The invention has been described with reference to a preferred embodiment. However, the scope of the invention is not limited to the illustrated embodiment, and alterations and modifications can be carried out without deviating from said scope of the invention. For instance do the individual laser resonators need not have a coinciding intracavity propagation axis, and the individual beams may instead be converted outside of the resonator or at a point, where the individual resonators cross each other.

LIST OF REFERENCE NUMERALS

In the numerals, X indicates a number, and x refers to a particular embodiment. Thus, for instance 403 refers to the second pump source of the fourth embodiment.

x01 laser system
x02 first pump source
x03 second pump source
x04 first focusing lens
x05 second focusing lens
x06 first gain element/laser crystal
x07 second gain element/laser crystal
x08 Q-switch
x09 nonlinear conversion element/nonlinear crystal
x10 partially reflecting mirror
x11 photo detector/power meter
x12 feedback
x13 output
x14 feedback regulation circuit/microprocessor
x15 output
x16 beam combining means
x17 first Q-switch
x18 second Q-switch
x21 first beam
x22 second beam
x31 control system
x32 optimsation system
x33 reference signal
x34 comparing means
x35 error signal
x36 control signal
x37 control signal
MX mirror
FX frequency

The invention claimed is:

1. A laser system (x01) comprising:
   pump generating means (x02, x03) for generating at least a first and a second pump beam,
   lasing means (x06, x07) for emitting radiation by being appropriately pumped,
      said lasing means (x06, x07) being disposed in a first resonator so as to receive the first pump beam in order to generate a first beam (x21) having a first frequency, and
      said lasing means (x06, x07) being disposed in a second resonator so as to receive the second pump beam in order to generate a second beam (x22) having a second frequency,
   at least one Q-switch (x08; x17, x18) being disposed in the first and the second resonator, so that the first beam and the second beam both pass a Q-switch (x08; x17, x18), and
   said laser system (x01) having an output (x13) generated from said first beam (x21) and said second beam (x22), wherein
   at least a part of said output (x13) is fed back to a regulation system (x14) comprising a comparator, a control system (x31) and an optimization system (x32), and wherein the control system (x31) provides a first control signal, and the optimization system (x32) provides a second control signal, to control the intensity output of the pump generating means (x02, x03), thereby regulating the build-up time of individual laser pulses of the first beam (x21) and second beam (x22), respectively.

2. The laser system according to claim 1, wherein said at least one Q-switch (x08; x17, x18) is an active Q-switch comprising an electro-optical or an acousto-optical Q-switch.

3. The laser system according to claim 1, wherein said at least one Q-switch (x08; x17, x18) is disposed in both the first resonator and the second resonator, so that the first beam (x21) and the second beam (x22) both pass the same Q-switch.

4. The laser system according to claim 1, wherein the pump means (x02, x03) is a single pump source comprising a laser diode.

5. The laser system according to claim 1, wherein the pump means (x02, x03) comprises at least a first pump source (x02) comprising a first laser diode, for generating the first pump beam, and a second pump source (x03) comprising a second laser diode, for generating the second pump beam.

6. The laser system according to claim 1, wherein the lasing means (x06, x07) is a single gain element or laser element.

7. The laser system according to claim 1, wherein the lasing means (x06, x07) comprise at least a first gain element or lasing element (x06) for generating said first beam (x21), and a second gain element or laser element (x07) for generating said second beam (x22).

8. The laser system according to claim 1, wherein said first resonator and said second resonator have a coinciding intracavity optical propagation axis.

9. The laser system according to claim 1, wherein said first resonator and said second resonator are linear resonator cavities and/or ring resonator cavities.

10. The laser system according to claim 1, wherein both said first resonator and said second resonator are ring resonator cavities.

11. The laser system according to claim 1, wherein the first resonator and the second resonator have a common output mirror.

12. The laser system according to claim 1, wherein the system additionally comprises a nonlinear conversion element (x09).

13. The laser system according to claim 12, wherein the nonlinear conversion element (x09) is positioned in the coinciding intracavity optical propagation axis.

14. The laser system according to claim 12, wherein the nonlinear conversion element (x09) is positioned after the common output mirror.

15. The laser system according to claim 12, wherein the nonlinear conversion element (x09) is positioned in the first cavity but outside the second cavity.

16. The laser system according to any of claim 12, wherein at least a part of the output from the nonlinear conversion element (x09) is fed back to the regulation system (x14).

17. The laser system according to claim 1, wherein the laser system comprises two or more Q-switches (x17, x18).

18. The laser system according to claim 1, wherein the output (x13) from the laser system is a nonlinear converted beam.

19. The laser system according to claim 1, wherein the output (x13) from the system has multiple laser lines or frequencies.

20. The laser system according to claim 1, wherein at least one pump beam is a focused pump beam.

* * * * *